(12) United States Patent
Kim et al.

(10) Patent No.: US 6,698,063 B2
(45) Date of Patent: Mar. 2, 2004

(54) HINGE ASSEMBLY FOR A FLAT DISPLAY MONITOR

(75) Inventors: Gyoung Bok Kim, Gumi-shi (KR); Dong Woo Kim, Taegu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/197,261

(22) Filed: Jul. 18, 2002

(65) Prior Publication Data

US 2003/0221288 A1 Dec. 4, 2003

(30) Foreign Application Priority Data

May 29, 2002 (KR) .................................... P2002-29842

(51) Int. Cl.⁷ ............................................. E05C 17/64
(52) U.S. Cl. .............................. 16/337; 16/340; 16/374; 16/382
(58) Field of Search ........................... 16/337–340, 374, 16/382, 387, 250; 361/680–683; 403/119, 120; 248/917, 923, 920, 921, 922, 371

(56) References Cited

U.S. PATENT DOCUMENTS

| | | | | |
|---|---|---|---|---|
| 5,109,570 A | * | 5/1992 | Okada et al. | 16/289 |
| 5,168,426 A | * | 12/1992 | Hoving et al. | 361/681 |
| 5,812,368 A | * | 9/1998 | Chen et al. | 361/681 |
| 5,894,633 A | * | 4/1999 | Kaneko | 16/306 |
| 6,038,739 A | * | 3/2000 | Katoh | 16/342 |
| 6,145,797 A | * | 11/2000 | Uehara | 248/291.1 |
| 6,163,928 A | * | 12/2000 | Chung | 16/342 |
| 6,231,021 B1 | * | 5/2001 | Hong | 248/371 |
| 6,418,010 B1 | * | 7/2002 | Sawyer | 361/681 |
| 6,532,628 B2 | * | 3/2003 | Kim | 16/342 |
| 6,539,582 B1 | * | 4/2003 | Chae | 16/340 |

FOREIGN PATENT DOCUMENTS

| | | | |
|---|---|---|---|
| JP | 11-257342 | * | 11/1999 |
| JP | 11-303850 | * | 11/1999 |

* cited by examiner

*Primary Examiner*—Chuck Y. Mah
(74) *Attorney, Agent, or Firm*—Jacobson Holman PLLC (57) ABSTRACT

A hinge assembly for a flat display monitor is enclosed. The hinge assembly according to the present invention includes a support plate fastened to a rear side of a flat display monitor; first and second mount brackets, each having a base side fastened to the support plate and a bracket side with a bracket hole; and a hinge shaft rotatably mounted so as to extend through the bracket hole of each mount bracket. The hinge assembly further includes a hinge tongue fixedly coupled to the hinge shaft, the hinge tongue also being coupled to a support leg; means for limiting an inclination angle of the flat display monitor by limiting an angular position of the hinge shaft; and means for adjusting a torque required to change the inclination angle of the flat display monitor. The hinge assembly of the present invention allows a user to adjust the inclination angle of a flat display monitor easily. In addition, the whole processes of making and assembling the hinge assembly are greatly simplified.

20 Claims, 9 Drawing Sheets

HINGE ASSEMBLY FOR A FLAT DISPLAY MONITOR

CROSS-REFERENCE TO RELATED APPLICATIONS

This application claims the benefit of Korean Patent Application No. P2002-29842, filed on May 29, 2002, which is hereby incorporated by reference as if fully set forth herein.

BACKGROUND OF THE INVENTION

1. Field of the Invention

The present invention relates to a flat display monitor, and more particularly, to a hinge assembly for a display device that enables a user to easily adjust the orientation of the flat display monitor and that can be easily manufactured through very simple processes.

2. Discussion of the Related Art

In general, a typical cathode-ray tube (CRT) monitor includes a display panel for displaying an image, a funnel coupled to the rear of the display panel, and an electron gun coupled to the rear of the funnel. This configuration becomes one of the disadvantageous limitations of the CRT monitor that the total volume and weight of the CRT monitor are quite large. In addition to the problem mentioned above, the CRT monitor has a further limitation that a user is easily fatigued when watching the CRT monitor for long hours due to its low image quality. For at least the problems set above, many people have recently started to use flat display monitors, e.g., Liquid Crystal Display (LCD) monitors, instead of the conventional CRT monitors because of the greatly reduced size and weight characteristics and high image quality of the flat display monitors.

Even though some users may prefer to mount their flat display monitors on the walls, it is much more common that a typical flat display monitor is placed on a flat area such as a desk and is connected to a main computer device and many communication cables. However, the existing monitor-supporting devices for many flat display monitors do not provide a desirable manner of adjusting the orientations of the monitors. Namely, the hinge assembly included in the existing monitor-supporting devices is designed in a way that a user needs to exert a large amount of force to adjust the inclination angle of a flat display monitor. In addition, the sizes and weights of the existing monitor-supporting devices are unnecessarily large, causing inconveniences to many users.

SUMMARY OF THE INVENTION

Accordingly, the present invention is directed to a hinge assembly for a flat display device that substantially obviates one or more problems due to limitations and disadvantages of the related art.

An object of the present invention is to provide a hinge assembly for a flat display monitor that enables a user to easily adjust the orientation of the flat display monitor.

Another object of the present invention is to provide a hinge assembly for a flat display monitor that can be made and assembled through fairly simple manufacturing processes.

Another object of the present invention is to provide a monitor-supporting system with a hinge assembly whose size and weight are significantly reduced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a hinge assembly of the present invention includes a support plate fastened to a rear side of a flat display monitor; first and second mount brackets, each having a base side fastened to the support plate and a bracket side with a bracket hole, the bracket side being provided perpendicular to the base side; and a hinge shaft rotatably mounted so as to extend through the bracket hole of each mount bracket.

The hinge assembly of the present invention further includes a hinge tongue fixedly coupled to the hinge shaft, the hinge tongue also being coupled to a support leg that supports the flat display monitor; means for limiting an inclination angle of the flat display monitor by limiting an angular position of the hinge shaft with respect to the bracket side; and means for adjusting a torque required to change the inclination angel of the flat display monitor.

The means for limiting the inclination angle described above includes a bracket groove provided on the bracket side of each of the first and second mount brackets, and a stopper with a restraining tip fixedly coupled to each of first and second side fitting portions of the hinge shaft so as to locate the restraining tip within the bracket groove. On the other hand, the means for adjusting the required torque includes a pair of torsional springs provided between the hinge tongue and each of the first and second mount brackets, one or more frictional washers provided on each end portion of the hinge shaft, and a tightening nut provided at each end of the hinge shaft so as to adjust the required torque by tightening or loosening the frictional washers.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 5:
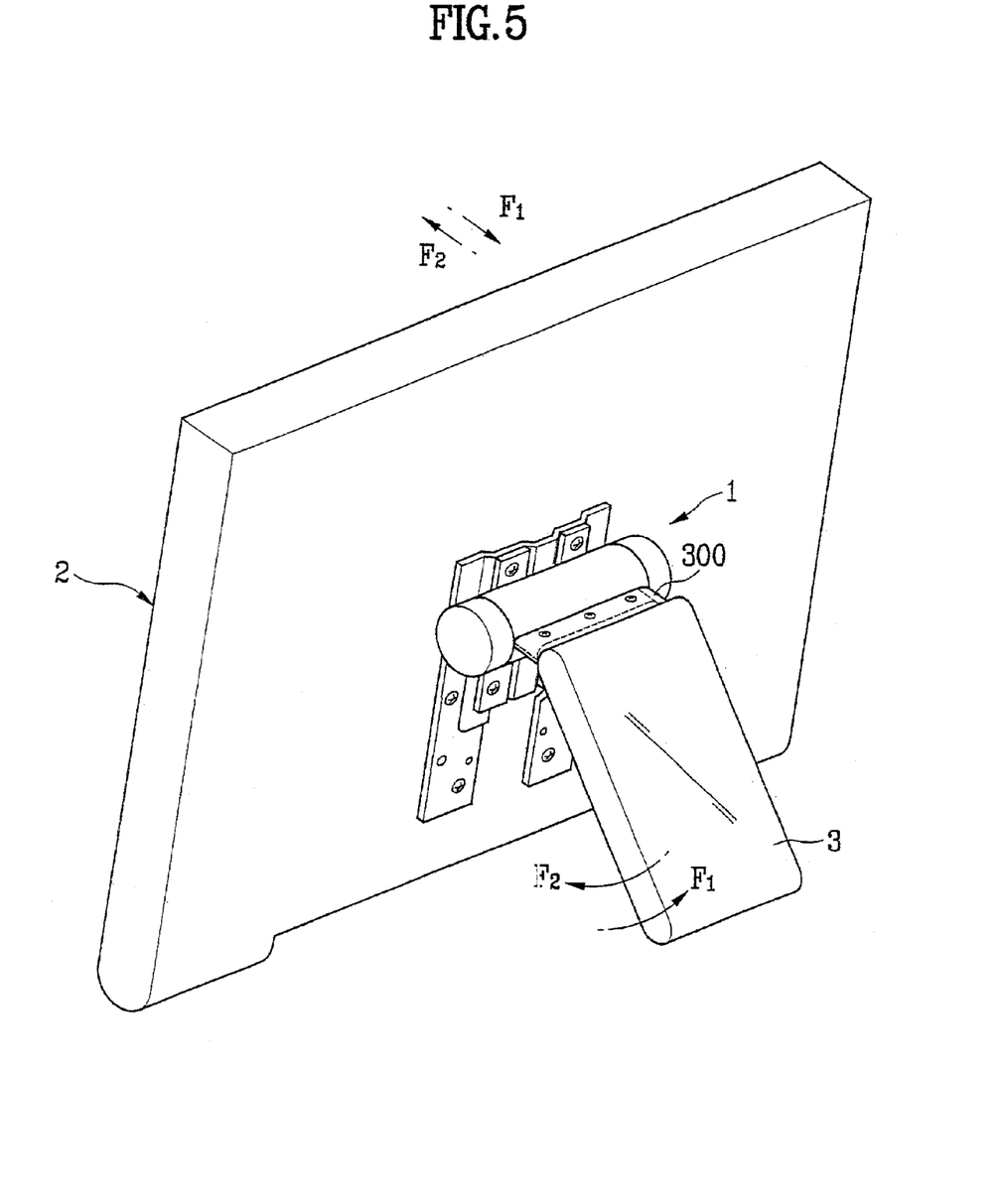
FIG. 5 illustrates a perspective view of a flat display monitor supported by a support leg which is connected to the monitor by a hinge assembly of the present invention.

FIG. 5 illustrates a perspective view of a flat display monitor 2 and a support leg 3 that are connected by a hinge assembly 1 according to the present invention. As shown in FIG. 5, the hinge assembly 1 of the present invention is connected to both of the flat display monitor 2 and support leg 3 for enabling a user to easily adjust the inclination angle of the monitor 2.

Figure 6:
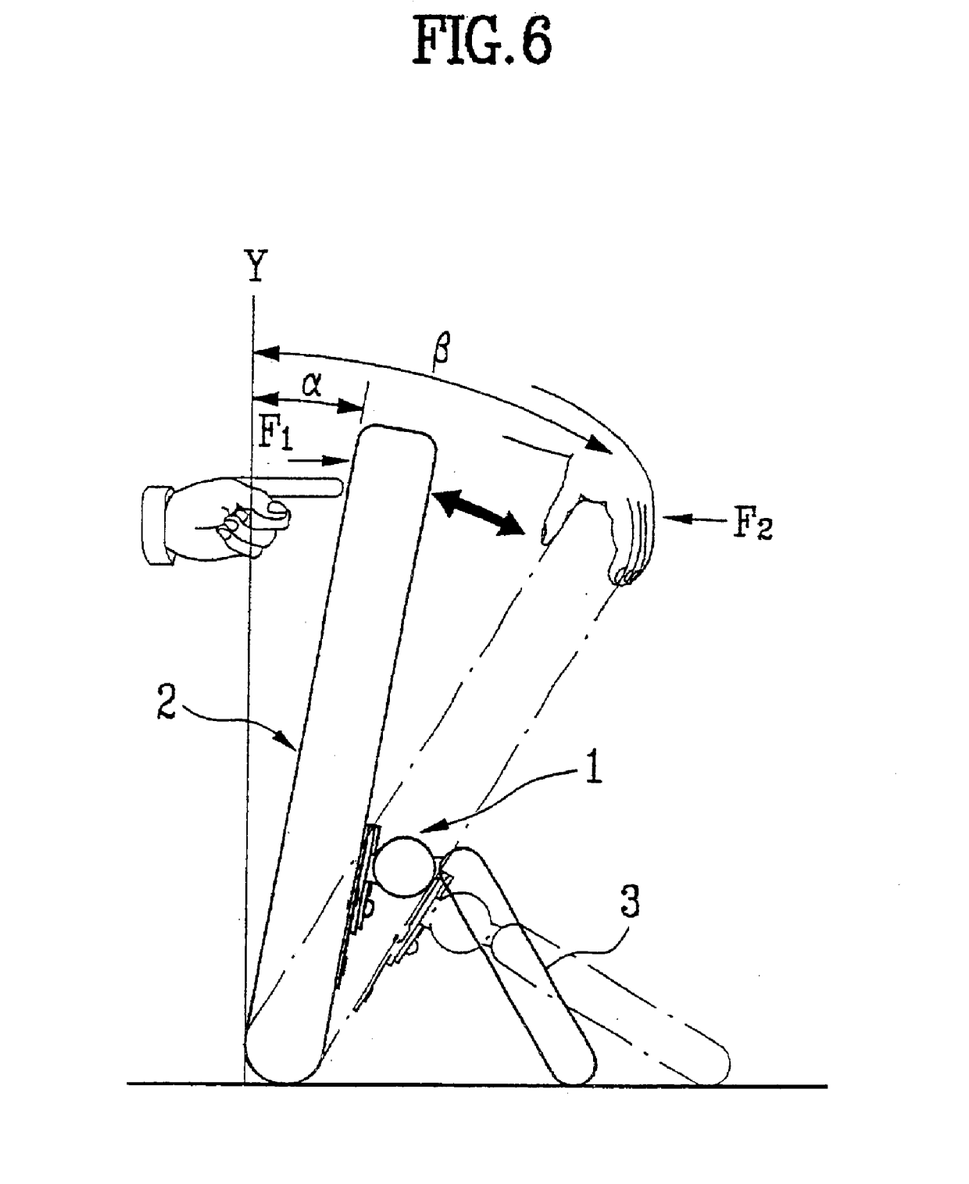
FIG. 6 illustrates a side view of the flat display monitor and support leg with the hinge assembly shown in FIG. 5.

FIG. 6 illustrates a side view of the flat display monitor 2, support leg 3, and hinge assembly 1 shown in FIG. 5 for showing how the hinge assembly 1 actually operates upon exerting an external force by a user. The inclination angle of the monitor 2 changes only when a user exerts a force on the monitor 2.

Figure 1:
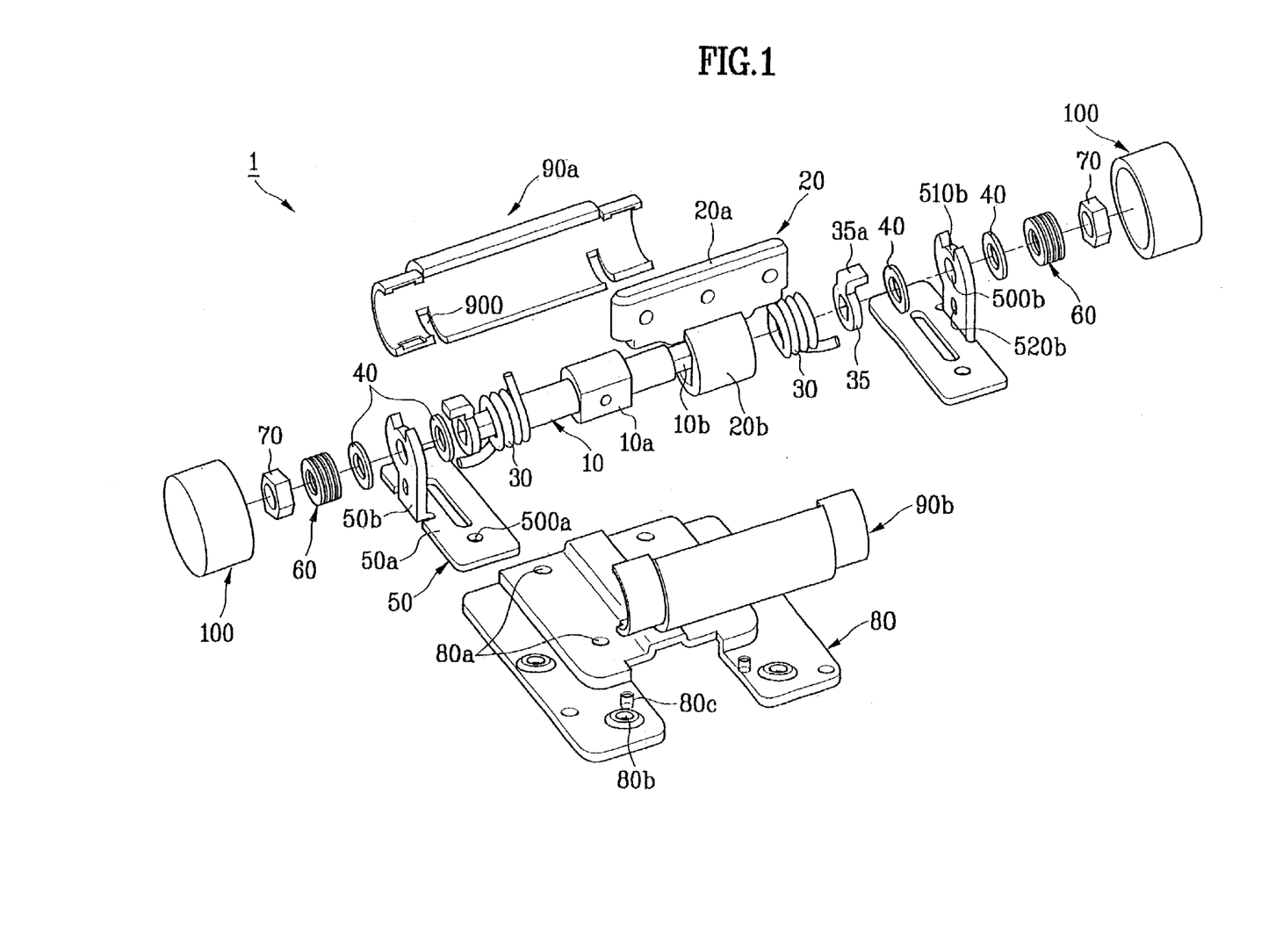
FIG. 1 illustrates an exploded perspective view of a hinge assembly of the present invention.
Figure 2A:
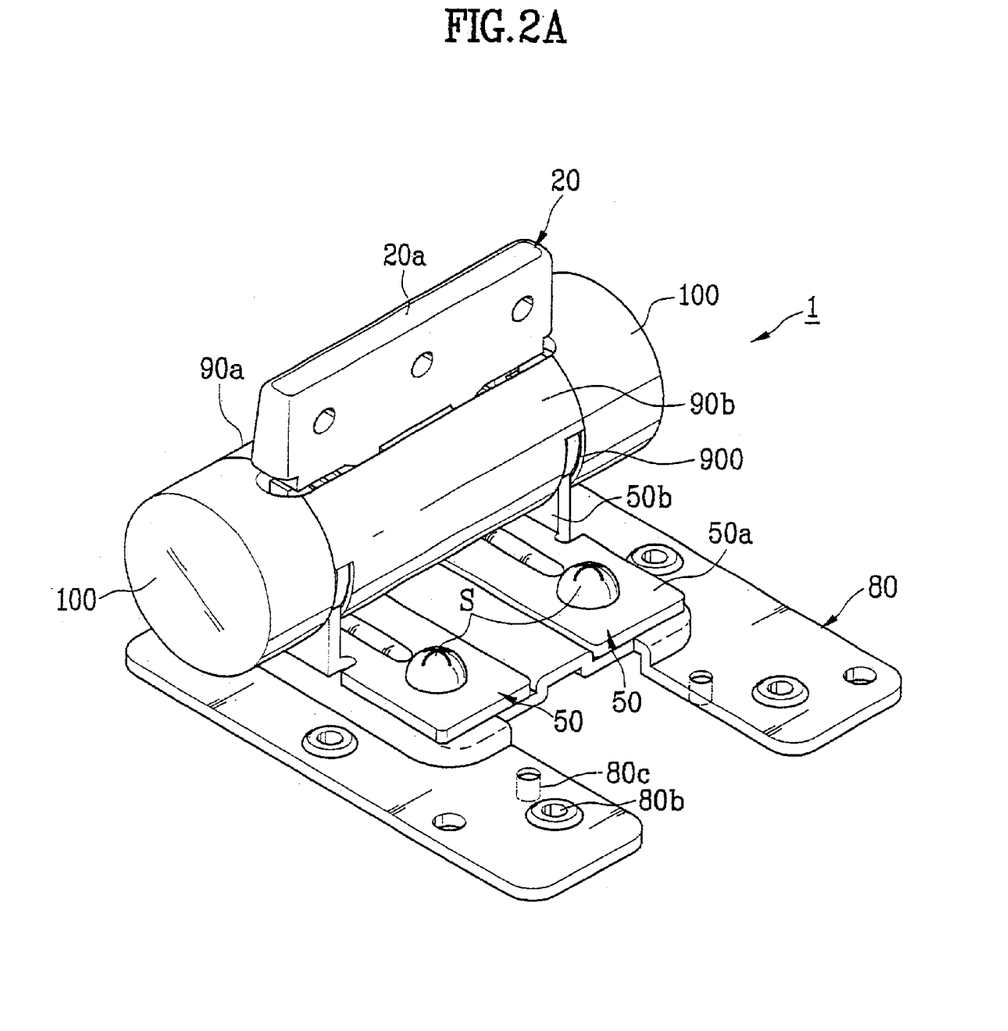
FIG. 2A illustrates a perspective view of a hinge assembly of the present invention with a hinge cover.
Figure 2B:
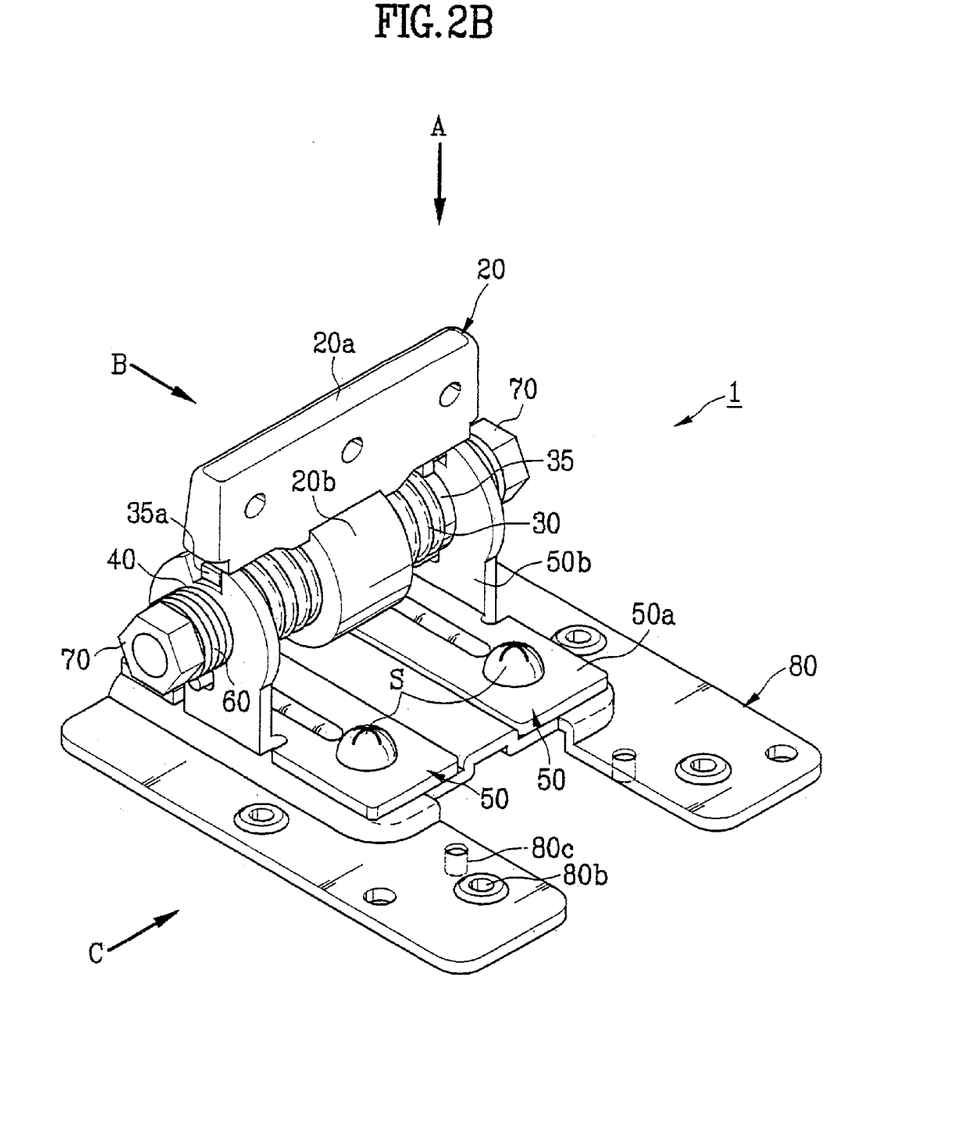
FIG. 2B illustrates a perspective view of the hinge assembly shown in FIG. 2A without the hinge cover.
Figure 3A:
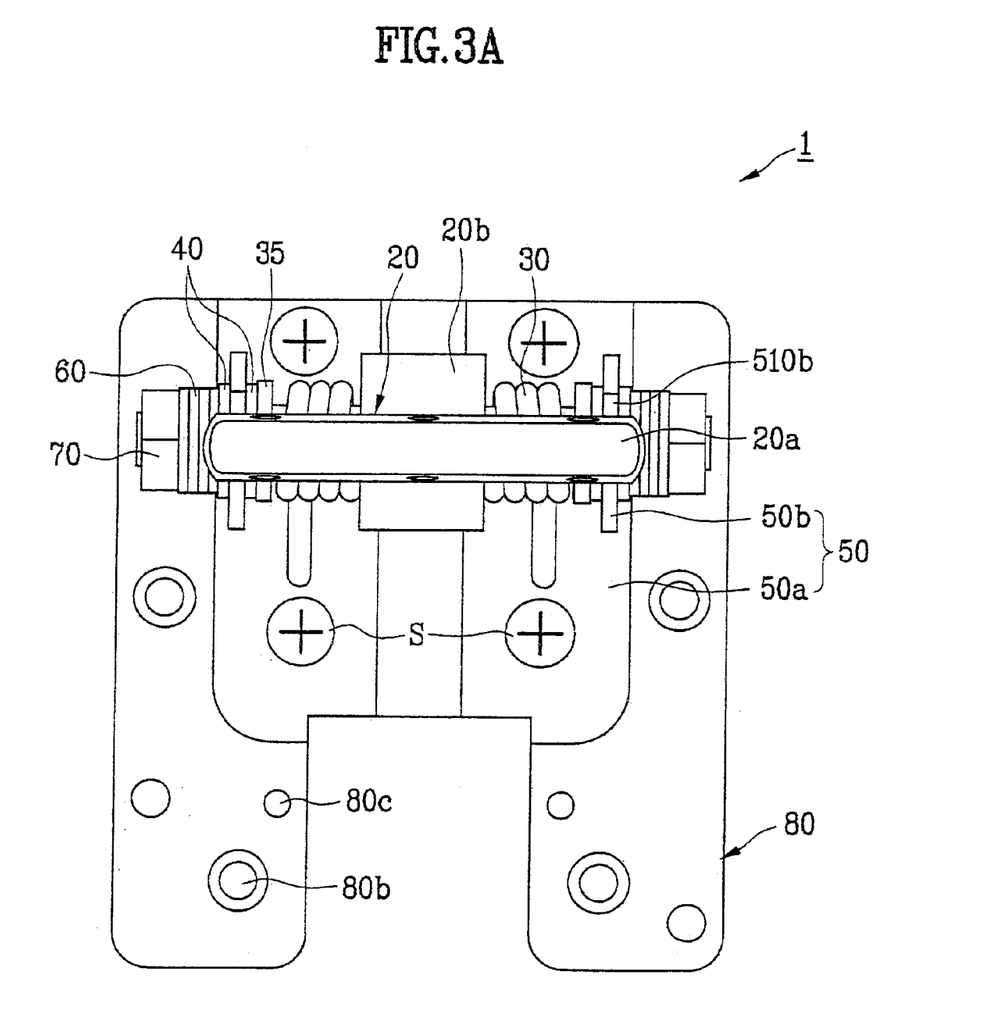
FIG. 3A illustrates a top view of the hinge assembly shown in FIG. 2B when viewed in the direction A.
Figure 3B:
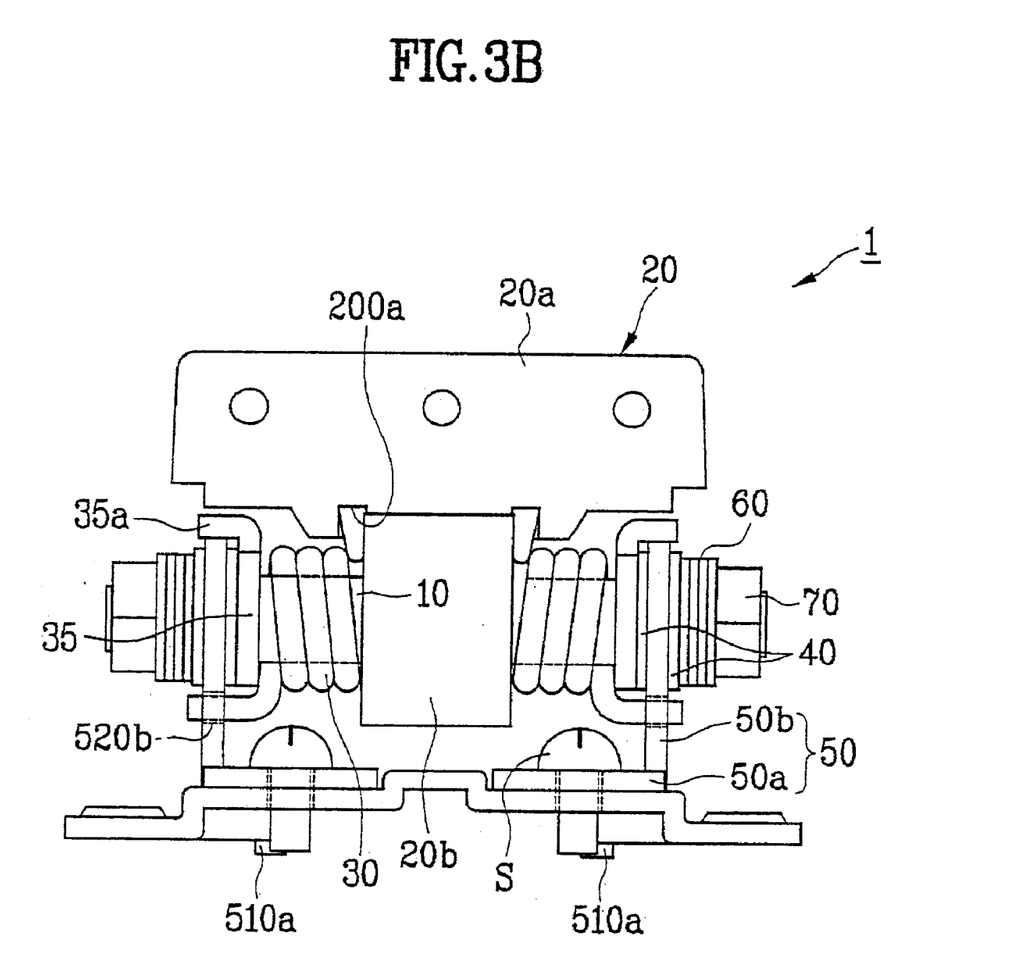
FIG. 3B illustrates a side view of the hinge assembly shown in FIG. 2B when viewed in the direction B.
Figure 3C:
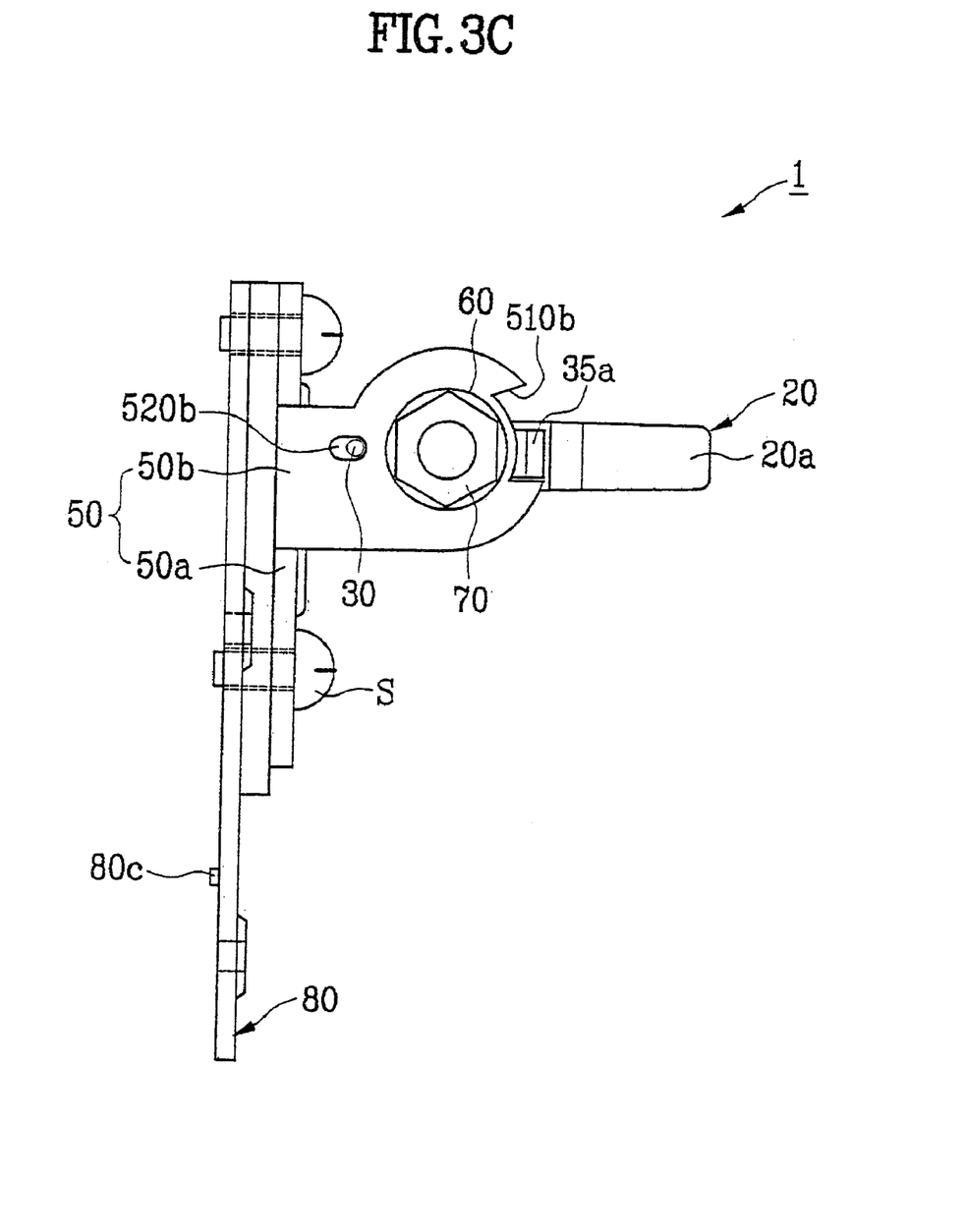
FIG. 3C illustrates a side view of the hinge assembly shown in FIG. 2B when viewed in the direction C.

FIGS. 1 to 3C illustrate a hinge assembly 1 of the present invention in detail. For example, FIG. 1 illustrates a perspective view of the hinge assembly 1, and FIG. 2A and FIG. 2B illustrate exploded perspective views of the hinge assembly 1 with and without a hinge cover. Moreover, FIG. 3A, 3B, and 3C illustrate the top and side views of the hinge assembly 1 shown in FIG. 2B when viewed in the directions A, B, and C, respectively.

Referring to FIG. 1 to FIG. 3C, the hinge assembly 1 of the present invention includes a support plate 80 being fastened to the rear side of the flat display monitor 2 as shown in FIG. 5 and left and right mount brackets 50 fixedly provided on the support plate 80 at a given distance from each other. Each mount bracket 50 has a base side 50a fixedly fastened to the support plate 80 and a bracket side 50b provided perpendicular to the base side 50a. The hinge assembly 1 further includes a hinge shaft 10 rotatably mounted so as to extend through the bracket holes 500b of the bracket sides 50b of both mount brackets 50. A middle fitting portion 10a is provided at the middle of the hinge shaft 10.

The hinge assembly 1 further includes a hinge tongue 20 fitted with the middle fitting portion 10a of the hinge shaft 10 and coupled to a support leg 3 that supports the flat display monitor 2. Finally, the hinge assembly 1 further includes means for limiting the inclination angle of the flat display monitor 2 for defining an allowable range of the inclination angle of the flat display monitor 2 by limiting the rotational angle of the hinge shaft 10; and means for adjusting the torque required to change the inclination angle of the flat display monitor 2.

Figure 4:
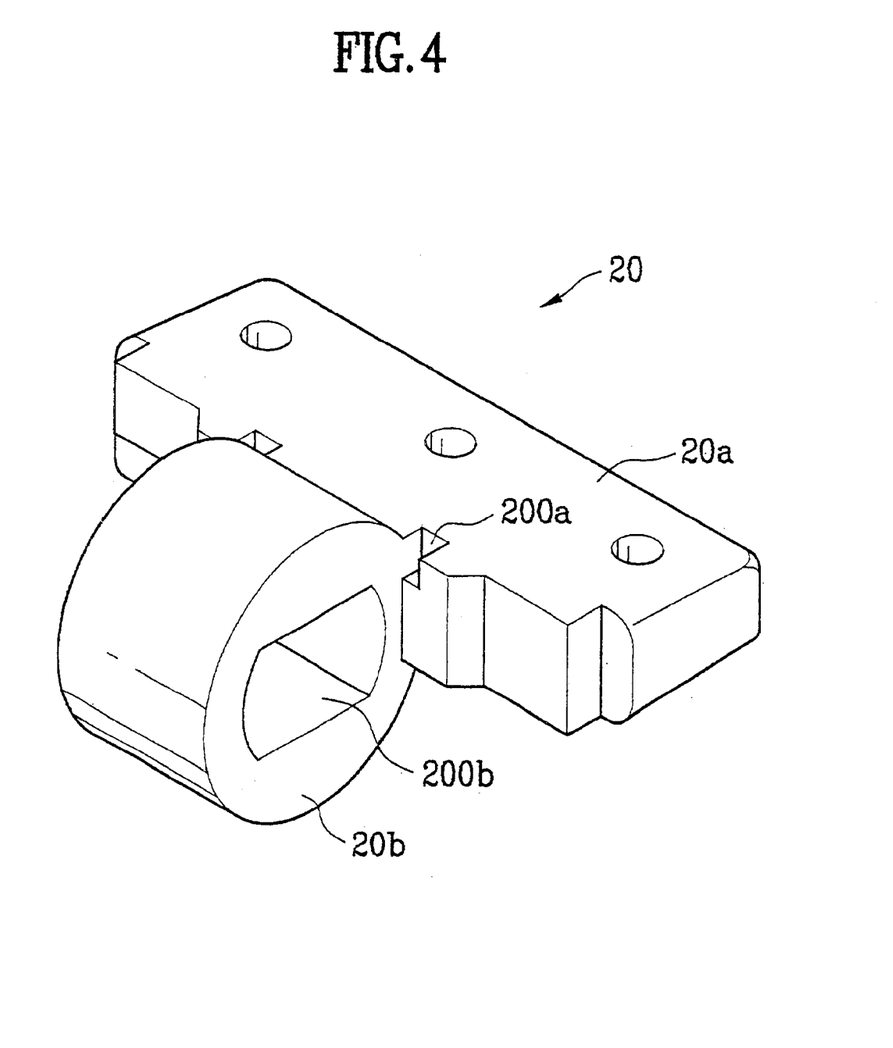
FIG. 4 illustrates a perspective view of a hinge tongue included in a hinge assembly of the present invention.

FIG. 4 illustrates the hinge tongue 20 included in the hinge assembly 1 of the present invention in greater detail. According to the figure, the hinge tongue 20 includes a sleeve portion 20b with a fitting hole 200b and a tongue portion 20a coupled to the support leg 3. The middle fitting portion 10a of the hinge shaft 10 is inserted into the fitting hole 200b of the sleeve portion 20b so that the hinge shaft 10 and the support leg 3 rotate at same time about the central axis of the hinge shaft 10.

The means for limiting the inclination angel of the flat display monitor 2 includes a bracket groove 510b in arc shape provided on the bracket side 50b of each mount bracket 50, and it further includes a stopper 35 with a restraining tip 35a provided on each side fitting portion 10b so as to locate the restraining tip 35a within the bracket groove 510b. An allowable range of the angular position of the hinge shaft 10 with respect to the support plate 80 is set by predefining the angular width and position of the bracket groove 510b, within which the restraining tip 35a of the stopper 35 moves along.

It is preferable that the bracket groove 510b is provided along the outer circumference of the bracket side 50a as shown in FIG. 1. Alternatively, the bracket groove 510b may be provided inward from the outer circumference of the bracket side 50a. The angular width and position of the bracket groove 510b are determined so as to limit the allowable range of the inclination angle of the flat display monitor 2 to 20 degrees. In addition, the angular position and width of the bracket groove 510b are determined so as to limit the minimum and maximum inclination angles of the flat display monitor 2 to 10 and 30 degrees, respectively.

On the other hand, the means for adjusting the torque mentioned above includes a pair of torsional springs 30 provided between the hinge tongue 20 and each mount bracket 50, one or more frictional washers 60 provided on each end portion of the hinge shaft 10, and a tightening nut 70 provided on each end of the hinge shaft 10. Referring to FIG. 3B, the ends of each torsional spring 30 are fastened to each mount bracket 50 and the hinge tongue 20, exerting a torsional force when the hinge tongue 20 is rotated with respect to the mount bracket 50. The frictional washers 60 exert a frictional force in a direction opposite to the rotational motion of the hinge shaft 10. Preferably, the frictional washers 60 are spring washers, and the number of the frictional washers 60 depends on the torque value required to support the monitor 2. Lastly, the main functions of the tightening nut 70 are to adjust the torque required to change the inclination angle of the flat display monitor 2 by tightening or loosening the frictional washers 60, and to prevent the breakaway of the frictional washers 60 from the hinge shaft 10 by being stably provided on each end of the shaft.

In addition, the hinge assembly 1 further includes four washers 40: one on each side of the bracket side 50b for both mount brackets 50. The main function of these washers 40 is to avoid any direct contacts between the stopper 35 and the bracket side 50b and between the bracket side 50b and the frictional washers 60.

Referring to FIG. 1, the support plate 80 has a first plurality of screw holes 80b for being fastened to the rear side of the flat monitor display 2, and a second plurality of screw holes 80a for being fastened to the mount brackets 50. In addition, one or more embossing projections 80c are provided on the bottom surface of the support plate 80 for assisting in fastening the support plate 80 to the rear side of the monitor 2 by inserting the embossing projections 80c into a number of grooves (not illustrated) provided on the backside of the monitor 2 before inserting screws through the first plurality of screw holes 80b and screw holes of the backside of the monitor 2.

Referring to FIG. 1 and FIG. 2, a hinge cover that covers the hinge shaft 10 is provided over the hinge shaft 10, and it is fixedly coupled to the hinge tongue 20. The hinge cover includes first and second sub-covers 90a and 90b that are hooked up together, and a slot 900 is provided on the bottom surfaces of both sub-covers 90a and 90b. The circumstantial length of the slot 900 is larger than the sum of the width of the lower part of the bracket side 50b and the maximum circular distance that the stopper 35 can move from a given position. At each end of the hinge cover, an end cap 100 is provided for further tightening the sub-covers 90a and 90b together. The hinge cover and the end caps 100 may be made of transparent materials for esthetic purposes.

Reference will now be made in detail to the methods of assembling a hinge assembly of the present invention. Initially, the hinge tongue 20 is coupled to the hinge shaft 10 by inserting the middle fitting portion 10a of the hinge shaft 10 into the fitting hole 200b of the sleeve portion 20b of the hinge tongue 20. Next, two torsional springs 30 are inserted into the hinge shaft 10, one from each direction so as to be placed next to the sleeve portion 20b of the hinge tongue 20. Subsequently, two stoppers 35 are provided on the side fitting portions 10b, respectively. Then, two washers 40 are inserted into the hinge shaft 10 so as to being placed next to each stopper 35 as shown in FIG. 1.

When all the components mentioned above are assembled on the hinge shaft 10, the left and right mount brackets 50 are inserted to the hinge shaft 10 from both directions. When inserting both mount brackets 50, one end of each torsional spring 30 should be inserted into one of the spring grooves 200a of the hinge tongue 20 and the other end of each spring 30 should be inserted into a spring groove 520b of each bracket side 50b. Next, another pair of washers 40 are inserted into the hinge shaft 10 from both directions, and a predetermined number of frictional washers 60 are inserted through each end of the hinge shaft 10. Next, a tightening nut 70 is fastened at each end of the hinge shaft 10. Finally, the mount brackets 50 are fastened to the support plate 80 by screwing bolts through both of the screw holes 80a of the support plate 80 and the screw holes 500a of the mount brackets 50. The hinge assembly assembled as described so far has an exterior view as shown in FIG. 2B.

Next, the hinge cover that covers the hinge shaft 10 is provided over the hinge shaft 10, and it moves together with the hinge tongue 20. The hinge cover includes first and second sub-covers 90a and 90b that are hooked up together, and the slot 900 is provided on the bottom surfaces of both sub-covers 90a and 90b as described earlier. The circumferential length of the slot 900 is longer than the sum of the width of the lower part of the bracket side 50b and the maximum circular distance that the stopper 35 can move with respect to the bracket side 50b. This is to prevent any collision between the hinge cover and any bracket side 50b.

After providing the hinge cover on the hinge assembly shown in FIG. 2B, an end cap 100 is provided at each end of the hinge cover as shown in FIG. 2A. Each end cap 100 covers the one-side ends of the sub-covers 90a and 90b for further tightening the sub-covers 90a and 90b together. The hinge cover and the end caps 100 are preferably made of transparent materials for esthetic purposes.

After the hinge cover and end caps 100 are assembled as shown in FIG. 2A, the hinge tongue 20 is coupled to the support leg 3 by inserting the tongue portion 20a of the hinge tongue 20 into a coupling portion 300 of the support leg 3 and screwing the tongue portion 20a together with the coupling portion 300. Then the support plate 80 is fastened to the backside of the flat display monitor 2 as shown in FIG. 5. One or more embossing projections 80c are provided on the bottom surface of the support plate 80 for assisting in fastening the support plate 80 to the backside of the monitor 2 by inserting the embossing projections 80c into one or more grooves (not illustrated) provided on the backside of the monitor 2 before inserting screws through the screw holes 80b. Referring to FIG. 5, the hinge tongue 20 is coupled to the support leg 3. However, the hinge tongue 20 and the support leg 3 can be made as a single body.

According to the hinge assembly of the present invention assembled as described above, the structure of the hinge shaft 10 is very simple, i.e., it needs to include the middle and side fitting portions 10a and 10b only, meaning that the hinge shaft can be easily manufactured. Consequently, the whole processes of assembling the hinge assembly of the present invention are greatly simplified.

Reference will now be made in detail to the operational steps of the hinge assembly of the present invention. As it can be seen from FIG. 6, when a flat display monitor 2 with a hinge assembly 1 of the present invention is placed on a flat area (e.g., desk or floor), they will be at equilibrium. All the components of the hinge assembly 1 are designed in a manner that the minimum inclination angel $\alpha$ of the monitor 2 at this stage is preferably about 10 degrees. When a user exerts a force F1 on the monitor 2 at the minimum inclination angle, this will create an external moment on the hinge shaft 10, and the hinge shaft 10 will start to rotate in a counterclockwise direction with respect to the monitor 2. This is because the support leg 3 will start applying a force on the hinge tongue 20, which is fixedly coupled to the hinge shaft 10. Therefore, the inclination angel between the monitor 2 and the vertical axis Y increases, and the angle between the support leg 3 and the monitor 2 also increases at same time. The monitor 2 is not allowed to rotate more than a maximum inclination angel of the monitor 2 set by the means for limiting the rotational angel of the hinge shaft 10 described earlier. In other words, the bracket groove 510b in arc shape provided on the bracket side 50b of each mount bracket 50 does not allow the stoppers 35 to rotate more than a given angular position with respect to the monitor 2. The maximum inclination angel $\beta$ of the monitor 2 is preferably about 30 degrees.

When the user stops exerting the force F1, the hinge shaft 10 does not rotate with respect to the monitor 2 any longer because the sum of the moments being exerted on the hinge shaft 10 due to the weight of the monitor and the torsional springs 30 is less than the frictional moment created by the friction washers 60.

On the other hand, when the user pulls the monitor 2 by exerting a force F2, this will create an external moment on the hinge shaft 10, and the hinge shaft 10 will start rotating in a clockwise direction. Since the only moment acting against the rotational motion of the hinge shaft 10 is the frictional moment of the friction washers 60, the inclination angle of the monitor 2 is decreased easily. As a result, the torque required to decrease the inclination angel of the monitor 2 is reduced, meaning that it is possible to reduce the inclination angle of the monitor 2 without exerting a large amount of force, Similarly, when the user stops exerting the force F2, the hinge shaft 10 will not rotate with respect to the monitor 2. Again, the whole system will be at equilibrium.

In conclusion, the hinge assembly according to the present invention allows a user to adjust the inclination angle of a flat display monitor easily. In addition, since each component included in the hinge assembly has a fairly simple structure, the whole processes of making and assembling a hinge assembly for a flat display monitor are greatly simplified. Consequently, the total weight and volume the hinge assembly of the present invention are less than those of the existing monitor-supporting devices, saving an even more space for a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A hinge assembly for a flat display monitor comprising:
   a support plate fastened to a rear side of a flat display monitor;
   first and second mount brackets, each having a base side fastened to said support plate and a bracket side with a bracket hole, said bracket side being provided substantially perpendicular to said base side;
   a hinge shaft rotatably mounted so as to extend through said bracket hole of each mount bracket;
   a hinge tongue fixedly coupled to said hinge shaft, said hinge tongue also being coupled to a support leg that supports said flat display monitor;
   means for limiting an inclination angle of said flat display monitor by limiting an angular position of said hinge shaft with respect to said bracket side; and
   means for adjusting a torque required to change said inclination angle of said flat display monitor.

2. The hinge assembly of claim 1, wherein said hinge tongue has a fitting hole, in which a middle fitting portion of said hinge shaft is fitted.

3. The hinge assembly of claim 1, wherein said hinge tongue includes a sleeve portion with a fitting hole and a tongue portion coupled to said support leg, said sleeve portion being fixedly coupled to said hinge shaft by fitting a middle fitting portion of said hinge shaft in said fitting hole of said sleeve portion.

4. The hinge assembly of claim 1, wherein said means for limiting said inclination angle includes a bracket groove provided on said bracket side of each of said first and second mount brackets, and a stopper with a restraining tip fixedly coupled to said hinge shaft so as to locate said restraining tip within said bracket groove.

5. The hinge assembly of claim 4, wherein said bracket groove is provided along an outer circumference of said bracket side of each mount bracket.

6. The hinge assembly of claim 4, wherein angular position and width of said bracket groove are determined so as to limit an allowable range of rotation of said flat display monitor to approximately 20 degrees.

7. The hinge assembly of claim 5, wherein angular position and width of said bracket groove are determined so as to limit an allowable range of rotation of said flat display monitor to approximately 20 degrees.

8. The hinge assembly of claim 6, wherein angular position and width of said bracket groove are determined so as to limit minimum and maximum inclination angles of said flat display monitor to 10 degrees and 30 degrees from a vertical axis, respectively.

9. The hinge assembly of claim 7, wherein said angular position and width of said bracket groove are determined so as to limit minimum and maximum inclination angles of said flat display monitor to 10 degrees and 30 degrees from a vertical axis, respectively.

10. The hinge assembly of claim 1, wherein said means for adjusting said required torque includes:
    a pair of torsional springs provided between said hinge tongue and each of said first and second mount brackets, said springs exerting a torsional force on said hinge tongue in a direction opposite to a rotational motion of said hinge shaft;
    one or more frictional washers provided on each end portion of said hinge shaft; and
    a tightening nut provided at each end of the hinge shaft so as to adjust said required torque by tightening or loosening said frictional washers.

11. The hinge assembly of claim 10, wherein said frictional washers are spring washers.

12. The hinge assembly of claim 10, further comprising four additional washers, each being provided along said hinge shaft and on both sides of said bracket side of each mount bracket.

13. The hinge assembly of claim 1, wherein said support plate has a first plurality of screw holes for being fastened to said rear side of said flat display monitor and a second plurality of screw holes for being fastened to said first and second mount brackets.

14. The hinge assembly of claim 1, wherein said support plate has one or more embossing projections for assisting in fastening said support plate to said rear side of said flat display monitor by inserting said embossing projections into a number of grooves provided on said rear side of said flat display monitor.

15. The hinge assembly of claim 1, further comprising a cylindrical hinge cover rotatably provided over said hinge shaft, said hinge cover being fixedly coupled to said hinge tongue.

16. The hinge assembly of claim 15, wherein said hinge cover includes first and second sub-covers hooked up together with a slot being provided on bottom surfaces of said first and second sub-covers.

17. The hinge assembly of claim 16, further comprising an end cap provided at each end of said hinge cover so as to further tighten said sub-covers together.

18. A hinge assembly for a flat display monitor comprising:
    first and second mount brackets, each having a base side fastened to a rear side of a flat display monitor and a bracket side with a bracket hole, said bracket side being generally perpendicular to said base side;
    a hinge shaft rotatably mounted so as to extend through said bracket hole of each mount bracket;
    means for limiting an inclination angle of said flat display monitor by limiting an angular position of said hinge shaft with respect to said bracket side; and
    means for adjusting a torque required to change said inclination angle of said flat display monitor.

19. The hinge assembly of claim 18, wherein said means for limiting said inclination angle includes a bracket groove provided on said bracket side of each of said first and second mount brackets, and a stopper with a restraining tip fixedly coupled to said hinge shaft so as to locate said restraining tip within said bracket groove.

20. The hinge assembly of claim 19, wherein said bracket groove limits said inclination angle to a range of rotation of approximately 20 degrees, with minimum and maximum inclination angles of said flat display monitor being approximately 10 degrees and 30 degrees from a vertical axis, respectively.

* * * * *